(12) United States Patent
Ho et al.

(10) Patent No.: US 6,240,947 B1
(45) Date of Patent: Jun. 5, 2001

(54) SOLENOID VALVE SEAT AND METHOD OF MAKING SAME

(75) Inventors: Thanh Ho, Brunswick; Robert J. Herbst, Avon, both of OH (US); Michael David Tober, Sanborn, NY (US)

(73) Assignee: AlliedSignal Truck Brake Systems Company, Elyria, OH (US)

( * ) Notice: Subject to any disclaimer, the term of this patent is extended or adjusted under 35 U.S.C. 154(b) by 0 days.

(21) Appl. No.: 09/382,039

(22) Filed: Aug. 24, 1999

(51) Int. Cl.$^7$ .............................. B21D 53/10; B21K 1/24
(52) U.S. Cl. ............... 137/15.18; 251/333; 29/890.122; 264/322
(58) Field of Search .................... 251/333, 334; 137/15.18; 264/322; 29/890.122, 890.127

(56) References Cited

U.S. PATENT DOCUMENTS

| | | | |
|---|---|---|---|
| 3,191,277 | * | 6/1965 | Glasgow .................. 29/890.122 |
| 3,395,890 | * | 8/1968 | Eckert et al. ................. 251/333 |
| 3,827,122 | * | 8/1974 | Douglas ................. 29/890.127 |
| 4,835,849 | * | 6/1989 | Morse ......................... 29/428 X |
| 4,995,346 | * | 2/1991 | Hudson, Jr. ................ 123/41.35 |
| 5,107,890 | * | 4/1992 | Gute ............................. 137/539 |
| 5,509,444 | * | 4/1996 | Robinson et al. ............ 137/508 |
| 5,545,370 | * | 8/1996 | Moren et al. ............ 264/322 X |

OTHER PUBLICATIONS

U.S. Application Serial No. 09/108,053.

* cited by examiner

*Primary Examiner*—Joseph A. Kaufman
*Assistant Examiner*—Eric Keasel

(57) ABSTRACT

An improved, air tight valve seat for a pneumatic brake system is achieved by using a plastic valve seat that is coined by the valve member. The valve member is a harder material, for example metal, than the thermo-plastic valve seat. The valve member is brought to an elevated temperature less than the melting point of the valve seat. The valve member engages the valve seat, coining the desired surface of the valve seat to conform it to the valve member. The heated valve member then remains in the valve assembly after coining.

10 Claims, 1 Drawing Sheet

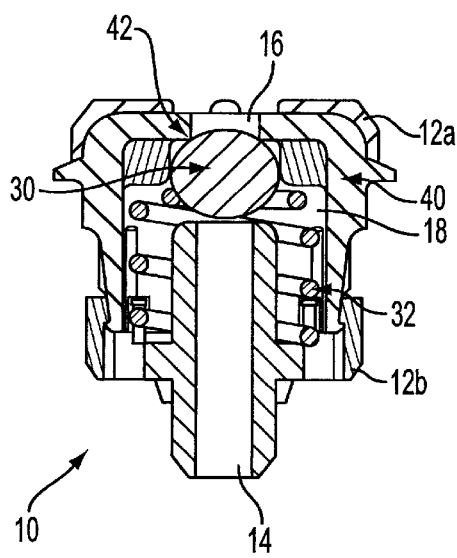
FIG. 1
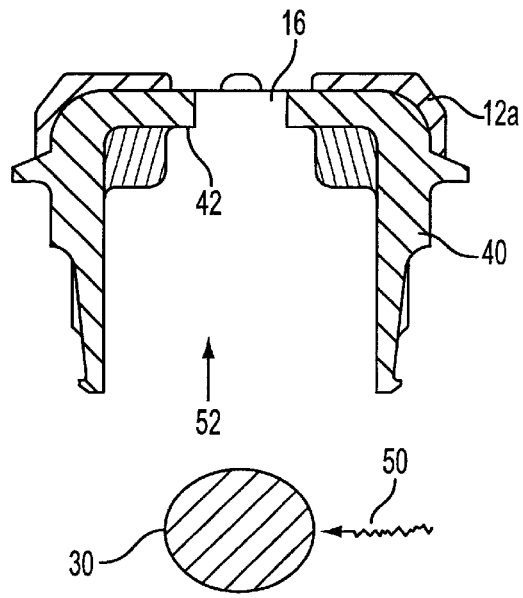
FIG. 2
LEAK TEST DATA BEFORE AND AFTER HEAT COINING PROCESS.
ALLOWABLE LEAKAGE 20 sccm (STANDARD CUBIC CENTIMETERS PER MINUTE) MAXIMUM.
| SEAT # | LEAKAGE DATA BEFORE COINING (sccm) | LEAKAGE DATA AFTER COINING (sccm) |
|---|---|---|
| 1 | 118 | 1 |
| 2 | 80 | 2 |
| 3 | 71 | 7 |
| 4 | 14 | 5 |
| 5 | 29 | 2 |
| 6 | 236 | 5 |
| 7 | 50 | 2 |
| 8 | 118 | 4 |
| 9 | 55 | 4 |
| 10 | 82 | 3 |
FIG. 3

SOLENOID VALVE SEAT AND METHOD OF MAKING SAME

BACKGROUND OF THE INVENTION

1. Field of the Invention

The present invention relates to a heavy vehicle ABS pneumatic brake system and, more particularly, the present invention relates to an improved valve seat for solenoid valve assemblies employed in modulators associated with pneumatic brake systems.

2. Discussion of the Art

Solenoid valve assemblies, and particularly the valve seats thereof, are of conventional structure in pneumatic brake systems. Typically the seats are made or formed of a bonded rubber. Rubber is desirable since it has good sealing qualities that conform to the valve member. That is, the elastomeric property of the rubber provides an air tight seal when the valve member engages the seat. This is one of the reasons that rubber seats are commonly used in pneumatic brake systems.

On the other hand, rubber or bonded rubber valve seats are relatively expensive. Also, due to compressibility of rubber, increased travel is needed to operate and seal a rubber valve seat. Moreover, they have durability issues. Temperature extremes result in different sealing capabilities of the valve seat. For example, when exposed to extremely cold temperatures, sealing performance of the valve decreases and is attributable at least in part to the valve seat. Accordingly, the inconsistency in performance, expense, and durability of bonded rubber valve seats have prompted consideration of alternative assemblies.

Thus, it would be desirable to provide a less expensive valve seat for a solenoid valve assembly used in a pneumatic brake system that overcomes the above-noted problems and others.

SUMMARY OF THE INVENTION

The present invention contemplates a new and improved valve assembly and a method of manufacturing the valve assembly for a pneumatic braking system and provides a simple, economical, and effective solenoid valve seat.

The valve assembly includes a housing having an inlet and outlet communicating with a valve chamber in the housing. A valve member is disposed in the chamber and moves toward open and closed positions relative to the outlet. A plastic valve seat is disposed in the valve chamber adjacent the outlet and is selectively engaged by the valve member. The valve seat has a contour formed by the valve member during manufacture so that it conforms to the valve member for improved sealing.

The valve assembly further includes a biasing member that urges the valve member toward the valve seat.

According to the inventive method of manufacturing the valve assembly, the valve member is heated to a predetermined temperature and brought into engagement with the valve seat for a predetermined time period to conform a portion of the valve seat to an external contour of the valve member.

According to another aspect of the manufacturing method, the valve member and the valve seat conformed thereto are maintained together as a combination in the completed valve assembly.

A primary advantage of the invention is the ability to decrease the cost of the overall assembly, provide effective performance through a wide range of temperatures, and assure effective sealing between the valve member and seat.

Yet another advantage of the invention resides in the simplified method of forming a precise fit between the valve member and the seat.

Still another advantage of the invention is found in the increased performance of the assembly since less travel is required to operate the valve.

Still other advantages and benefits of the invention will become apparent to those skilled in the art upon a reading and understanding of the following detailed description.

BRIEF DESCRIPTION OF THE DRAWINGS

The invention may take physical form in various parts and arrangements of parts, a preferred embodiment and method of which will be described in detail in the specification. A preferred arrangement of the invention is illustrated in the accompanying drawings. The drawings include:

FIG. 1 which is a longitudinal cross-sectional view through a solenoid valve assembly;

FIG. 2 which is a schematic representation of the steps involved in a preferred process of manufacturing the improved valve assembly; and FIG. 3 which is a table of test data demonstrating the improved performance of the subject invention.

DETAILED DESCRIPTION OF THE PREFERRED EMBODIMENT AND METHOD

Reference is made to the drawings which show a preferred embodiment of the invention and a method of forming the preferred embodiment only, and are not intended to limit the invention. FIG. 1 illustrates a valve assembly 10 that includes a housing 12 having an inlet 14 and an outlet 16. The housing 12 includes a hollow cavity that defines a valve chamber 18 disposed between the inlet and outlet. Although the inlet and outlet are axially aligned, it will be appreciated that the present invention is not particularly limited to the embodiment as illustrated.

More particularly, the present valve assembly is a solenoid valve seat as used in a modulator of an anti-lock brake system (ABS). As shown, the solenoid valve assembly is in a normally closed position where a valve member, such as ball 30, is urged toward a closed position adjacent the outlet via a biasing member, such as coil spring 32.

In heavy-duty vehicle or truck brake systems, the pneumatic system typically uses valve seats formed of a bonded rubber material for the reasons noted above in the Background section. The present invention proposes to use a thermo-plastic as an alternative to the bonded rubber seat. For example, a glass-filled nylon is desirable because of the reduced variability in performance over a wide temperature range. In addition, the plastic valve seat can be easily formed to a wide variety of configurations and is inexpensive. Nevertheless, leakage test data has shown that further improvement in using plastic valve seats as an alternative is required before plastic is adopted. The present invention resolves these issues.

More particularly, it was determined that an improved seal was required between the valve member and the valve seat. Thus, the plastic valve seat assembly 40 includes a coined valve seat 42 that is disposed at the interface between the cavity 18 and the outlet 16. Although FIG. 1 is a longitudinal cross-section of the valve assembly, it will be appreciated that the circular cross-sectional opening 16 defines an annular valve seat 42. The valve seat must conform to the external surface of the metal ball valve member.

Various alternatives for conforming the valve seat to the valve member were considered. For example, machining the nylon valve seat was proposed as one solution. A tapered or chamfered edge was formed in the nylon. It is believed, however, that the machining operation exposes the glass support fibers in the plastic and leaves a roughened surface that, although an improvement over non-tapered arrangements, still does not achieve the desired results in leakage tests.

Another consideration is to burnish or friction heat the components together. It will be appreciated that it is difficult to control the pressure and heat that results from this type of operation. Thus, although some improvement may be realized, inconsistency in the leakage test data suggests that friction heating the valve member and the seat together to deform the valve seat into a desired conformation is not the most desired solution.

The preferred arrangement for conforming the valve member and the valve seat results from a coining operation in which a measurable deformation is formed in the valve seat on the order of 0.0005-to-0.0010 inches in depth. More specifically, and as illustrated in FIG. 2, the thermoplastic material is held in a fixture (not shown). The valve member, or metal ball, is then heated to an elevated temperature (represented by reference numeral 50). Preferably, the ball is heated to approximately the melting temperature of the valve seat, e.g. just less than the melting temperature which in the case of the glass filled nylon plastic seat is between approximately three hundred and four hundred degrees Fahrenheit (300–400 F.) in the tested valve assemblies. This temperature range is slightly less than the melting point of the plastic from which the valve seat is formed so that the seat is not melted but coined. Under such conditions, the valve seat becomes more susceptible to being shaped or formed. The process shaping or forming a material at elevated temperatures, at which the material is more susceptible to being shaped or formed, is known in the art as thermal forming. The heated ball and valve seat are advanced relative to one another (represented by reference numeral 52) so that the ball engages the valve seat for a predetermined time period. In the preferred arrangement, since the ball member cools quickly it engages the valve seat for approximately one (1) second, although the ball member can remain in contact with the valve seat as it cools. The heated ball coins the valve seat and provides the desired mating fit between the valve member and the valve seat.

Remaining assembly of the valve is then completed. That is, housing portion 12b, which includes the inlet 14 is secured to the first housing portion 12a and the valve seat, and encloses the ball member and spring 32. The same valve member used to coin the associated valve seat remains in matched relationship with the seat. After the valve member has coined the seat, it is allowed to cool for a second predetermined time period and can remain in contact with the valve seat and become part of the assembly without removal. Again, according to the preferred embodiment, the second predetermined time period is approximately one (1) second since the metal ball member dissipates the heat relatively quickly so that continued assembly of the valve can be completed in a short time frame.

FIG. 3 summarizes test data from a series of ten (10) valve seats tested for leakage before coining (column 2) and compared with leakage tests conducted after the coining operation. The improved results associated with the plastic seat formed in accordance with the present invention are tabulated in column 3. As is evident, significant improvement is achieved in the leakage test data, or stated another way, the seal between the ball member and the coined valve seat is vastly improved.

The invention has been described with reference to the preferred embodiment and method of forming same. Obviously, modifications and alterations will occur to others upon a reading and understanding of this specification. For example, the valve member may have a different conformation or be formed from a different material that is harder or has a higher melting point than the valve seat. For example, the valve member may be a ceramic material rather than the metal ball described above. Alternative plastic or thermoplastic materials may also be used. Consequently, the particular temperature ranges to which the valve member is heated, as well as the melting point of the particular valve seat, can vary without departing from the present invention. Still further, the predetermined time periods of approximately one (1) second are merely illustrative and it is recognized that other time periods could be used. The present invention is intended to include all such modifications and alterations in so far as they come within the scope of the appended claims and the equivalents thereof.

Having thus described the invention, it is now claimed:

1. A method of manufacturing a valve assembly comprising the steps of:

supplying a valve member;

supplying a valve seat formed of a material that is susceptible to thermal forming;

heating the valve member to a temperature that is greater than the temperature of the valve seat; and engaging the valve seat with the heated valve member to conform a portion of the valve seat to an external contour of the valve member.

2. The method of claim 1 wherein the heating step includes raising the temperature of the valve member to approximately the melting temperature of the valve seat without reaching or exceeding the melting temperature of the valve seat.

3. The method of claim 1 comprising the further steps of providing a biasing member for urging the valve member against the valve seat after the valve seat has cooled from engagement with the heated valve member.

4. The method of claim 1 comprising the further step of waiting a preselected time period after the engaging step to allow the valve member and the valve seat to cool.

5. The method of claim 1 wherein the heating step includes heating the valve member to a range of approximately three hundred (300) degrees Fahrenheit to approximately four hundred (400) degrees Fahrenheit.

6. The method of claim 1 wherein the engaging step lasts approximately one (1) second.

7. The method of claim 6 comprising the further step of waiting approximately one second after the engaging step before continued assembly to allow the valve member and the valve seat sufficient time to cool.

8. The method of claim 1 wherein the valve seat is formed from plastic.

9. The method of claim 8 wherein the valve member is formed of metal and is capable of being heated to a melting point temperature of the valve seat without deforming said valve member.

10. The method of claim 8 wherein the valve member is formed from metal having a higher melting point than the plastic.

* * * * *